United States Patent
Simpson et al.

(10) Patent No.: US 7,601,213 B2
(45) Date of Patent: *Oct. 13, 2009

(54) PIGMENT AND COATING COMPOSITION CAPABLE OF INHIBITING CORROSION OF SUBSTRATES

(75) Inventors: Charles H. Simpson, Avon, OH (US); Michael W. Peck, Coffeyville, KS (US); Lisa M. Wright, Coffeyville, KS (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,149

(22) Filed: Dec. 5, 2008

(65) Prior Publication Data

US 2009/0078159 A1    Mar. 26, 2009

Related U.S. Application Data

(63) Continuation of application No. 11/734,867, filed on Apr. 13, 2007, now Pat. No. 7,462,233.

(60) Provisional application No. 60/791,741, filed on Apr. 13, 2006.

(51) Int. Cl.
*C09C 3/06* (2006.01)
*C09C 1/02* (2006.01)

(52) U.S. Cl. ............... 106/462; 106/461; 106/463; 106/464; 106/465; 106/466; 423/430; 428/403; 428/404; 524/405

(58) Field of Classification Search ............ 106/461, 106/462, 463, 464, 465, 466; 423/430; 428/403, 428/404

See application file for complete search history.

(56) References Cited

U.S. PATENT DOCUMENTS

| 3,380,836 | A | * | 4/1968 | Robinson ............... 106/14.25 |
|---|---|---|---|---|
| 5,643,499 | A | * | 7/1997 | Boyd et al. ............... 252/387 |
| 5,643,631 | A | * | 7/1997 | Donigian et al. ........... 427/218 |
| 5,879,442 | A | * | 3/1999 | Nishiguchi et al. ......... 106/464 |
| 6,139,616 | A | * | 10/2000 | Nagayama et al. ......... 106/431 |
| 6,572,694 | B2 | * | 6/2003 | Towe ..................... 106/464 |
| 7,462,233 | B2 | * | 12/2008 | Simpson et al. ............ 106/462 |
| 2006/0165583 | A1 | * | 7/2006 | Makino et al. ............. 423/432 |

FOREIGN PATENT DOCUMENTS

| EP | 482962 B1 | * | 12/1995 |
| EP | 930347 A1 | * | 7/1999 |
| JP | 06-057168 A | * | 3/1994 |

* cited by examiner

*Primary Examiner*—Anthony J Green
(74) *Attorney, Agent, or Firm*—Eryn Ace Fuhrer; Robert E. McDonald; Deron A. Cook

(57) ABSTRACT

The present invention relates to a pigment and a coating composition comprising such a pigment, wherein it is contemplated that a coating composition containing such pigment is capable of inhibiting corrosion of a substrate to which it is applied. In one embodiment, the pigment comprises a filler having calcium borate, calcium molybdate, and calcium phosphate deposited on the surface of the filler. In an exemplary embodiment, the filler is calcium carbonate.

20 Claims, No Drawings

PIGMENT AND COATING COMPOSITION CAPABLE OF INHIBITING CORROSION OF SUBSTRATES

CROSS-REFERENCE TO PRIOR APPLICATIONS

This application is a continuation of co-pending application Ser. No. 11/734,867 filed Apr. 13, 2007, which claims priority from U.S. Provisional Application 60/791,741 filed Apr. 13, 2006. The entireties of both application Ser. No. 11/734,867 and Provisional Application 60/791,741 are hereby incorporated by reference.

TECHNICAL FIELD

This invention relates to a new pigment produced by the reaction of inorganic acids on the surface of reactive mineral fillers. In one embodiment, the reaction of the inorganic acids with the mineral fillers are done so that the surface reaction products are present in ratios contemplated to provide corrosion resistance when incorporated into coating compositions.

BACKGROUND OF THE INVENTION

Certain pigments are generally added to coatings in order to aid in the prevention of rusting or other degradation of metal surfaces to which the coatings are applied. Historically, such "corrosion-inhibiting" pigments contain slightly soluble zinc salts. However, because of environmental considerations there has been increased interest in zinc-free corrosion inhibitors. In addition to having some detrimental environmental effects, it has also been observed that some pigments containing zinc may have a destabilizing effect on latex resins, which often forms the basis of the more environmentally desirable waterborne coating compositions being developed today.

DETAILED DESCRIPTION OF THE INVENTION

One useful embodiment of the invention involves a pigment that comprises the reaction product of a filler compound, a calcium reagent, a borate compound, a molybdate compound and a phosphate compound. In some embodiments of the invention, the filler compound and the calcium reagent may be the same compound. In one useful embodiment, the phosphate compound, the borate compound and the molybdate compounds are phosphoric acid, boric acid, and molybdenum trioxide respectively. An exemplary pigment in accordance with the present invention comprises about 75% by weight filler, such as calcium carbonate, and about 25% by weight of a mixture of calcium borate, calcium molybdate and calcium phosphate, wherein at least some of the calcium borate, calcium molybdate, and calcium phosphate are deposited on the surface of the filler. The pigment of the present invention may be incorporated into coating compositions, such as latex paints and primers. Such coating compositions may be applied to metal substrates and allowed to dry. It is contemplated by the present invention that such coatings are capable of protecting the substrate from corrosion. In some particularly useful embodiments of the invention, the pigment is substantially free or completely free of zinc.

In one useful embodiment, the pigment of the present invention is a multi-phase pigment formed from the reaction of a phosphate compound, such as a phosphate based acid or salt, a borate compound, such as a borate based acid or salt, and a molybdate compound, such as a molybdate based acid or salt with a mineral filler and a calcium containing reagent. In one embodiment, the mineral filler may be a calcium based compound and act as both the mineral filler and the calcium reagent. Without being limited to any particular theory, it is believed that the resulting pigment contains calcium phosphate, calcium borate, and calcium molybdate particles deposited on the surface of the filler particle.

Fillers used in the present invention may be selected from various inorganic compounds such as calcium carbonate, calcium sulfate, calcium metasilicate, magnesium silicate, silica, barium sulfate, and nepheline syenite. If a filler that does not also act as a calcium reagent is used in the present invention, a calcium reagent must be added to the reaction. Suitable calcium reagents contain calcium hydroxide, calcium carbonate, or any other calcium containing material that has a calcium atom capable of reacting to form calcium phosphate, calcium molybdate, and calcium borate upon reaction with compounds containing phosphate, molybdate or borate.

The pigment is prepared by reacting a filler and a calcium reagent, such as a mixture of magnesium silicate and calcium hydroxide or calcium carbonate (which acts as both a filler and a calcium reagent) with a phosphate compound, a molybdate compound, and a borate compound. Phosphate based compounds may be selected from any compound that can react with a calcium reagent such as calcium carbonate or calcium hydroxide to form calcium phosphate. Phosphate based compounds include, but are not limited to phosphoric acid, which has a general formula of $H_3PO_4$ and which is also commonly referred to as orthophosphoric acid. Other phosphate compounds include, but are not limited to pyrophosphoric acid, tripolyphosphoric acid, phosphoric anhydride, tetrapolyphosphoric acid and metaphosphoric acids, such as trimetaphosphoric acid and cyclo-triphosphoric acid. Polyphosphoric acids which have the general formula of $HO(PO_2OH)_xH$, where x equals the number of phosphoric acid groups may also be used. For example, x may be about 2 to about 4. Salts of various phosphate based acids may also be used and are formed by replacing 1, 2, or 3 of the H atoms by reacting with a molar equivalent of a base, such as sodium hydroxide.

Borate compounds may be selected from any compound capable of reacting with a calcium reagent to form calcium borate. Borate compounds useful in the present invention, include but are not limited to borate based acids, for example boric acid having a general formula of $H_3BO_3$ also known as metaboric acid. Other boric compounds that may be used include, but are not limited to tetraboric acid, pyroboric acid, boron trioxide any hydrates of boric oxide. Salts of any of the borate based acids may also be used.

Molybdate compounds used in the present invention may be selected from any compound capable of reacting with a calcium reagent to form calcium molybdate. Molybdate compounds include, but are not limited to molybdic acid $(H_2MoO_4)$, molybdenum trioxide $(MoO_3)$, and hydrates of molybdenum trioxide such as the monohydrate or dihydrate of molybdenum trioxide.

In forming the pigment of the present invention, the filler and/or calcium reagent are mixed with water in a reaction vessel. The phosphate compound, the borate compound, and the molybdate compound are each mixed with water and added sequentially to the vessel containing the filler and/or calcium reagent. After the reaction is substantially complete, the solids may be separated by filtration or centrifuge or by other known means.

In one useful embodiment, the filler comprises about 75% by weight of the total pigment. In such an embodiment, the calcium phosphate, calcium borate, and calcium molybdate together comprise about 25% of the total pigment weight.

In preparing the pigment of the present invention, the amounts of the phosphate, borate, and molybdate compounds may be varied to achieve certain amounts of calcium phosphate, calcium borate and calcium molybdate in the final product. For instance, in one embodiment, calcium phosphate may comprise about 2.5% to about 20% of the final product, for example about 11.4% to about 14.1%. In some embodiments, the calcium borate may comprise about 2.5% to about 20% by weight of the final product, for example about 2.5% to about 5.3% by weight. Also, the calcium molybdate may comprise about 2.5% to about 20% by weight of the final product, for example about 8.4% to about 11.3% by weight.

Pigments of the present invention may be employed in a variety of paint and coatings formulations. As used herein, the terms "paint" and "coating" are used broadly and encompass any one of a variety of solid and liquid mixtures comprising a binder, optionally a carrier vehicle, and the pigment described herein, wherein the paint or coating, upon application to a substrate, is effective to form a protective film. In liquid paint and coating systems, the vehicle comprises the liquid portion of the paint or coating composition and may be composed of any one of the well known film-forming constituents or binders in combination with a volatile solvent or thinner, which is adapted to evaporate during the during or curing of the paint film, or alternatively, in some instances, may itself react with the binder constituent and become an integral portion thereof. In accordance with known paint and coatings technology, the solvent or thinner may be omitted in those situations in which the paints or coating composition are of the hot-melt type, or wherein they are adapted to be applied to a substrate utilizing an electrostatic spray or powder spray technique, in which the thinning effect of such solvent is usually unnecessary.

The specific type of binder material employed is not critical, provided that it is compatible with the pigments described herein, and may include any of those known in the coating art as being suitable for formulating protective coatings.

The pigment of the present invention can be formulated into various coating compositions, for example latex coatings. In one embodiment, the coating may be a latex coating composition, such as a primer used, at least in part, to inhibit corrosion on a surface to which it is applied. Latex coating compositions in which the pigment of the present invention may be useful, generally contain from about 2% to about 65% by weight binder, for example, about 15% to about 25%. Binders may be polymeric, such as acrylics, or non-polymeric, such as potassium silicate. The water content may be from about 30% to about 95%, for instance from about 40% to about 65%. The composition may also include thickeners, such as urethane thickeners, hydroxyethyl cellulose thickeners, and acrylic thickeners in amounts up to about 10% by weight, for example about 1% to about 2%. The content of inorganic materials may be from about 5% to about 50% by weight, for example, about 10% to about 40%. Such inorganic components may comprise titanium dioxide (e.g. 0 to about 30% titanium dioxide) based on the nature of the coating compositions. Other colored pigments may also be used alone or in combination to produce a wide range of colored paint. Suitable additional pigments may include calcium carbonate, talc, clay, silicates, aluminum silicates, calcium metasilicates, aluminum potassium silicates, magnesium silicates, barium sulfates, nepheline syenite, feldspar, zinc oxides or sulfides, or others known to those skilled in the art. Such pigments may be included in amounts up to about 60% by weight, for example, about 10% to about 20%. Synthetic organic materials might also be incorporated; these include plastic beads, hollow spheres or other similar materials. Other optional components include glycols such as ethylene and/or propylene glycol in amounts from 0 to about 7% and other solvents such as diethylene glycol dibenzoate and dipropylene glycol dibenzoate in amounts up to about 3%. The coating composition may also contain pigment dispersing agents which can be solvents or surfactants; biocides such as amine or sulfur compounds, halogen donors, or metals; foam control agents such as oils, fatty acids and silicones; slip and mar additives; adhesion promoters, and/or other known paint additives.

In other embodiments, the pigments in accordance with the present invention may be incorporated into a variety of coating compositions including but not limited to water and solvent based epoxies, water and solvent based alkyds, polyurethane and polyurea coatings. The method of incorporation of the pigments of the present invention into these and other types of coatings would be apparent to one of ordinary skill in the art.

The pigment of the present invention may be included in coating compositions in amounts effective for producing a stable coating composition that is capable of inhibiting corrosion of a surface, such as about 1% to about 10% by weight of the total coating composition, for example about 4% to about 7% by weight.

Without being limited to any particular theory, it is believed that calcium borate, calcium molybdate, and calcium phosphate are slightly soluble in water. Thus, when the pigments of the present invention are incorporated into a coating composition and applied to a metal substrate, the pigment of the present invention may release the slightly soluble borate, molybdate, and phosphate compounds to protect the substrate from rusting or otherwise degrading. Without being limited to any particular theory, it is believed that the calcium borate particles may be released first as the most soluble of the three particles, followed by the calcium molybdate and then the calcium phosphate. The release of the three compounds with differing solubilities may allow for longer lasting corrosion protection.

It has been observed that coatings incorporating the pigment of the present invention exhibit comparable and, in some embodiments, exhibit superior performance in the fields of salt-spray performance, weathering, and humidity performance compared to coatings comprising zinc-containing pigments. It has also been observed that coatings incorporating the pigments of the present invention exhibit stability that is comparable to, and in some cases, superior to coatings including zinc-containing pigments. Stability of the coating compositions can be measured by observing the change in viscosity of the coating material after it has been stored in a heated oven for a period of time. For example, coatings containing pigments made in accordance with the present invention showed a viscosity change of about 3 to about 5 KU when stored in an oven having a temperature of about 120° F. for a period of about 2 weeks. Such coating compositions also showed a viscosity change of about 3 to about 9 KU in an oven set at a temperature of about 120° C. for a period of about 4 weeks The present invention will be better understood by reference to the following examples, which are provided for purposes of illustration only and are not to be construed as limiting the scope of the present invention.

Example 1

A pigment in accordance with the present invention may be prepared as follows: In a reaction vessel, 3,432 g of tap water is mixed with 838.1 g of calcium carbonate and 13.8 g of technical grade calcium hydroxide. This mixture is heated to about 160-180° F. with agitation. The temperature and agitation are maintained in this vessel throughout the remainder of the reaction. In a separate vessel, 22.7 g of technical grade boric acid is mixed with 100 g water. The mixture is added to the reaction vessel. The reaction is allowed to proceed for about 30 minutes. After about 30 minutes, 85.5 g of technical grade phosphoric acid (75%) is added to the reaction vessel. The reaction is allowed to proceed for about 30 minutes. In a separate vessel, about 74.1 g of technical grade molybdenum trioxide is mixed with 100 g of water. After the reaction with the phosphoric acid proceeds for about 30 minutes, the molybdenum trioxide mixture is added to the reaction vessel. The final mixture is allowed to react for up to about 4 hours.

After the up to about 4 hour reaction, the solids are separated by filtration and dried at 225° F. The solids may be milled to break up any particle agglomerates. The theoretical composition is about 2.5% calcium borate, about 11.3% calcium molybdate, about 11.2% calcium phosphate, and about 75% calcium carbonate with the borate, phosphate and molybdate particles believed to be adhering to the surface of the calcium carbonate particles.

Example 2

A paint composition including a pigment in accordance with the present invention may be prepared by admixing the following ingredients in the order listed:

| Component | % By Weight |
|---|---|
| Water | 6.52 |
| Dispersant[1] | 2.18 |
| Titanium Dioxide | 9.72 |
| Ammonia | 0.10 |
| Calcium Carbonate Extender[2] | 17.11 |
| Pigment of Example 1 | 4.66 |
| Defoamer[3] | 0.10 |
| Ethylene glycol monobutyl ether[4] | 4.58 |
| Styrene acrylic latex[5] | 47.13 |
| TEXANOL ester alcohol | 0.84 |
| Propylene glycol monomethyl ether[6] | 1.30 |
| Dispersant[7] | 0.22 |
| Plasticizer[8] | 1.15 |
| 10% Ammonium Benzoate | 2.79 |
| Associative thickener[9] | 0.28 |
| Water | 1.30 |

[1]SURFYNOL CT-131 available from Air Products.
[2]ATOMITE ® available from IMERYS.
[3]DREWPLUS L-475 available from Drew Chemical.
[4]EASTMAN EB available from Eastman Chemical Company.
[5]AQUAMAC 740 available from Eastman Chemical Company.
[6]DOWANOL DPNB available from Dow Chemical.
[7]SURFYNOL DF-210 available from Air Products.
[8]SANTICIZER 160 available from Solutia.
[9]ACRYSOL TT-615 available from Rohm & Haas.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A pigment comprising the reaction product of:
   a calcium reagent;
   a borate compound;
   a molybdate compound; and
   a phosphate compound.

2. The pigment of claim 1, further comprising magnesium silicate as a filler compound.

3. The pigment of claim 2, wherein the calcium reagent is calcium hydroxide.

4. The pigment of claim 1, wherein the calcium reagent is calcium carbonate.

5. The pigment of claim 1, wherein the borate compound is selected from metaboric acid, tetraboric acid, pyroboric acid, boron trioxide, hydrates of boric oxide, and salts of boric based acids.

6. The pigment of claim 1, wherein the molybdate compound is selected from molybdic acid, molybdenum trioxide, and hydrates of molybdenum trioxide.

7. The pigment of claim 1, wherein the phosphate compound is selected from orthophosphoric acid, pyrophosphoric acid, tripolyphosphoric acid, phosphoric anhydride, tetrapolyphosphoric acid, metaphosphoric acids, and salts of phosphate based acids.

8. The pigment of claim 1, wherein the phosphate compound is a polyphosphoric acid having the general formula of $HO(PO_2)OH_xH$.

9. The pigment of claim 8, wherein x is about 2 to about 4.

10. A pigment comprising:
    a filler;
    calcium borate;
    calcium molybdate; and
    calcium phosphate,
    wherein at least some of the calcium borate, calcium molybdate, and calcium phosphate are deposited on the surface of the filler.

11. The pigment of claim 10, wherein the pigment is substantially free of zinc.

12. The pigment of claim 10, wherein the calcium borate comprises about 2.5% to about 20% by weight of the total pigment.

13. The pigment of claim 10, wherein the calcium molybdate comprises about 2.5% to about 20% by weight of the total pigment.

14. The pigment of claim 10, wherein the calcium phosphate comprises about 2.5% to about 20% by weight of the total pigment.

15. The pigment of claim 10 wherein the filler is magnesium silicate.

16. The pigment of claim 10 wherein the filler is calcium carbonate.

17. A coating composition comprising:
    a binder;
    water;
    a pigment comprising a filler and a mixture of calcium borate, calcium molybdate and calcium phosphate, wherein at least some of the calcium borate, calcium molybdate and calcium phosphate are deposited on the surface of the filler.

18. The coating composition of claim 17, wherein the filler is magnesium silicate.

19. The coating composition of claim 17, wherein the filler is calcium carbonate.

20. The coating composition of claim 17, wherein the pigment is substantially free of zinc.

* * * * *